(12) United States Patent
Lamson

(10) Patent No.: US 10,823,414 B2
(45) Date of Patent: Nov. 3, 2020

(54) HOODED ENTRANCE TO EFFUSION HOLES

(71) Applicant: United Technologies Corporation, Farmington, CT (US)

(72) Inventor: Scott H. Lamson, Menands, NY (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 208 days.

(21) Appl. No.: 15/925,223

(22) Filed: Mar. 19, 2018

(65) Prior Publication Data
US 2019/0285277 A1 Sep. 19, 2019

(51) Int. Cl.
| F23R 3/06 | (2006.01) |
| F23R 3/00 | (2006.01) |
| F01D 25/12 | (2006.01) |

(52) U.S. Cl.
CPC .............. *F23R 3/002* (2013.01); *F01D 25/12* (2013.01); *F23R 3/06* (2013.01); *F05D 2250/51* (2013.01); *F05D 2260/201* (2013.01); *F23R 2900/03041* (2013.01); *F23R 2900/03044* (2013.01)

(58) Field of Classification Search
CPC .. F23R 3/002; F23R 3/06; F23R 2900/03041; F23R 2900/03044; F01D 25/12; F05D 2260/201
See application file for complete search history.

(56) References Cited

U.S. PATENT DOCUMENTS

| 3,777,484 A | * | 12/1973 | Dibelius ................. F23R 3/002 60/757 |
| 8,099,961 B2 | | 1/2012 | Gerendas |
| 9,518,738 B2 | | 12/2016 | Gerendas |

(Continued)

FOREIGN PATENT DOCUMENTS

| EP | 1205635 A2 | 5/2002 |
| EP | 2584148 A1 | 4/2013 |

(Continued)

OTHER PUBLICATIONS

The Extended European Search Report for Application No. 19163888. 1-1006; Report dated Aug. 14, 2019; 8 pages.

*Primary Examiner* — Steven M Sutherland
(74) *Attorney, Agent, or Firm* — Cantor Colburn LLP

(57) ABSTRACT

A gas turbine engine component assembly including: a first component having a first surface and second surface opposite the first surface, the first component includes a cooling hole extending from second surface to first surface; a second component having a first surface and second surface, the first surface of first component and second surface of second component defining a cooling channel therebetween in fluid communication with the cooling hole for cooling second surface of second component; and an aperture extension feature in the second component and extending into cooling channel, the aperture extension feature includes a passageway fluidly connecting cooling channel to an area located proximate to the first surface of second component, the aperture extension feature includes a face and inlet located in the first face to fluidly connect passageway to cooling channel, the first face being oriented between 0° and 120° relative to second surface of second component.

16 Claims, 6 Drawing Sheets

(56) References Cited

U.S. PATENT DOCUMENTS

| | | | |
|---|---|---|---|
| 2015/0121885 A1* | 5/2015 | Yokota | F23R 3/005 60/754 |
| 2015/0128602 A1* | 5/2015 | Clemen | F23R 3/002 60/754 |
| 2016/0123592 A1* | 5/2016 | Drake | F23R 3/005 60/752 |
| 2017/0176006 A1 | 6/2017 | Gerendas | |
| 2017/0234537 A1 | 8/2017 | Bunker | |

FOREIGN PATENT DOCUMENTS

| | | |
|---|---|---|
| EP | 3032175 A1 | 6/2016 |
| EP | 3239462 A1 | 11/2017 |
| JP | 2014148938 A | 8/2014 |
| WO | 9525932 A | 9/1995 |

\* cited by examiner

HOODED ENTRANCE TO EFFUSION HOLES

BACKGROUND

The subject matter disclosed herein generally relates to gas turbine engines and, more particularly, to a method and apparatus to cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand, and dirt.

SUMMARY

According to an embodiment, a gas turbine engine component assembly is provided. The gas turbine component assembly including: a first component having a first surface and a second surface opposite the first surface, the first component includes a cooling hole extending from the second surface to the first surface through the first component; a second component having a first surface and a second surface, the first surface of the first component and the second surface of the second component defining a cooling channel therebetween in fluid communication with the cooling hole for cooling the second surface of the second component; and an aperture extension feature in the second component and extending outward from the second surface of the second component into the cooling channel, the aperture extension feature includes a passageway fluidly connecting the cooling channel to an area located proximate to the first surface of the second component, the aperture extension feature includes a first face and an inlet located in the first face to fluidly connect the passageway to the cooling channel, the first face being oriented at a selected angle between 0° and 120° relative to the second surface of the second component.

In addition to one or more of the features described herein, or as an alternative, further embodiments may include that the first face extends outward from the second surface of the second component into the cooling channel.

In addition to one or more of the features described herein, or as an alternative, further embodiments may include that the selected angle is equal to 90°.

In addition to one or more of the features described herein, or as an alternative, further embodiments may include that the selected angle is an acute angle.

In addition to one or more of the features described herein, or as an alternative, further embodiments may include that the inlet is located at the second surface.

In addition to one or more of the features described herein, or as an alternative, further embodiments may include that the inlet is located a selected distance away from the second surface.

In addition to one or more of the features described herein, or as an alternative, further embodiments may include that the selected distance is outside of a boundary layer associated with the second surface of the second component within the cooling channel.

In addition to one or more of the features described herein, or as an alternative, further embodiments may include that the second component further comprises a cooling hole extending from the second surface of the second component to the first surface of the second component and fluidly connecting the passageway to the area located proximate the first surface of the second component, and the passageway includes an outlet that fluidly connects the passageway to the cooling hole of the second component.

In addition to one or more of the features described herein, or as an alternative, further embodiments may include that the aperture extension feature is integrally formed in the second component.

In addition to one or more of the features described herein, or as an alternative, further embodiments may include that the aperture extension feature is attached to the second surface of the second component through a mechanical joint.

According to another embodiment, a combustor for use in a gas turbine engine is provided. The combustor enclosing a combustion chamber having a combustion area. The combustor including: a combustion liner having an inner surface and an outer surface opposite the inner surface, the combustion liner includes an impingement aperture extending from the outer surface to the inner surface through the combustion liner; a heat shield panel having a first surface and a second surface, the inner surface of the combustion liner and the second surface of the heat shield panel defining an impingement cavity therebetween in fluid communication with the impingement aperture hole for cooling the second surface of the heat shield panel; and an aperture extension feature in the heat shield panel and extending outward from the second surface of the heat shield panel into the impingement cavity, the aperture extension feature includes a passageway fluidly connecting the impingement cavity to the combustion area, the aperture extension feature includes a first face and an inlet located in the first face to fluidly connect the passageway to the impingement cavity, the first face being oriented at a selected angle between 0° and 120° relative to the second surface of the heat shield panel.

In addition to one or more of the features described herein, or as an alternative, further embodiments may include that the first face extends outward from the second surface of the heat shield panel into the impingement cavity.

In addition to one or more of the features described herein, or as an alternative, further embodiments may include that the selected angle is equal to 90°.

In addition to one or more of the features described herein, or as an alternative, further embodiments may include that the selected angle is an acute angle.

In addition to one or more of the features described herein, or as an alternative, further embodiments may include that the inlet is located at the second surface.

In addition to one or more of the features described herein, or as an alternative, further embodiments may include that the inlet is located a selected distance away from the second surface.

In addition to one or more of the features described herein, or as an alternative, further embodiments may include that the selected distance is outside of a boundary layer associated with the second surface of the heat shield panel within the impingement cavity.

In addition to one or more of the features described herein, or as an alternative, further embodiments may include that the heat shield panel further comprises a effusion aperture extending from the second surface of the heat shield panel to the first surface of the heat shield panel and fluidly connecting the passageway to the combustion area, and the passageway includes an outlet that fluidly connects the passageway to the effusion aperture of the heat shield panel.

In addition to one or more of the features described herein, or as an alternative, further embodiments may include that the aperture extension feature is integrally formed in the heat shield panel.

In addition to one or more of the features described herein, or as an alternative, further embodiments may include that the aperture extension feature is attached to the second surface of the heat shield panel through a mechanical joint.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 4A:
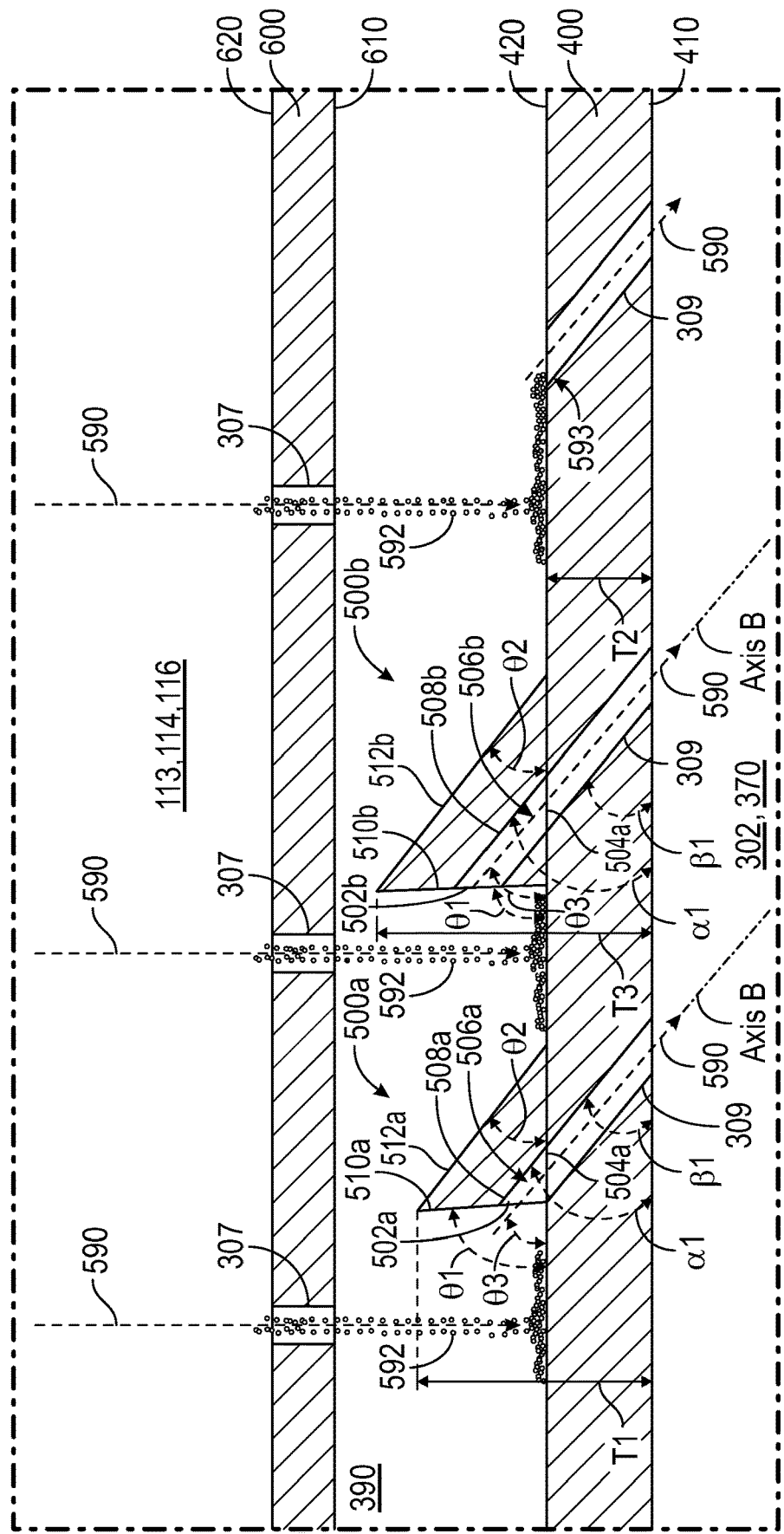
FIG. 4A is an illustration of a configuration of a aperture extension feature for a combustor of a gas turbine engine, in accordance with an embodiment of the disclosure.
Figure 4B:
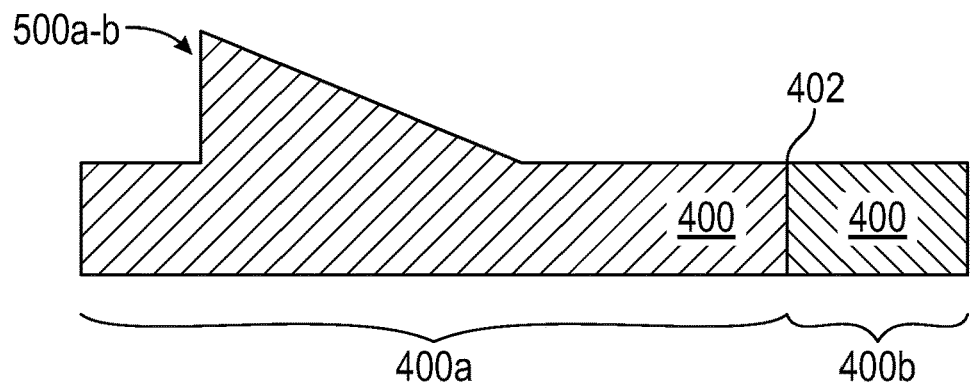
FIG. 4B is an illustration of a method of manufacturing the aperture extension feature of FIG. 4A, in accordance with an embodiment of the disclosure.
Figure 4C:
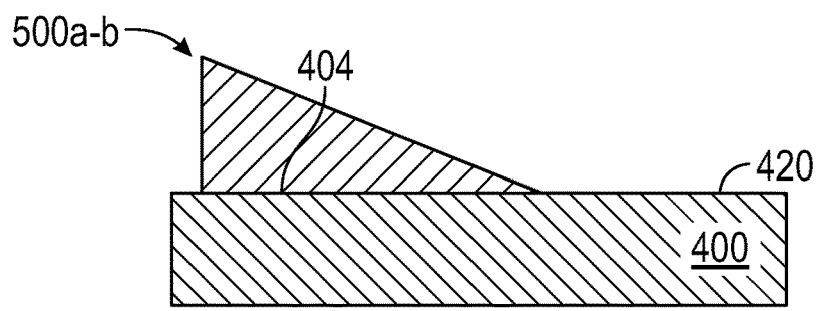
FIG. 4C is an illustration of a method of manufacturing the aperture extension feature of FIG. 4A, in accordance with an embodiment of the disclosure.
Figure 4D:
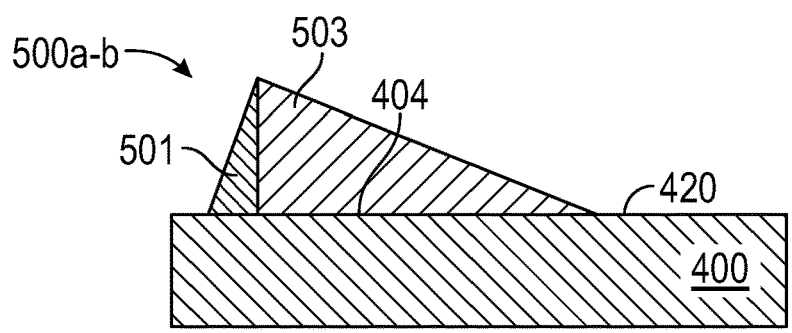
Figure 4E:
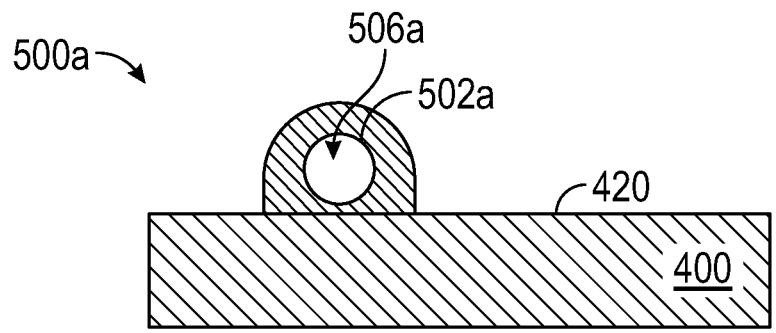
Figure 4F:
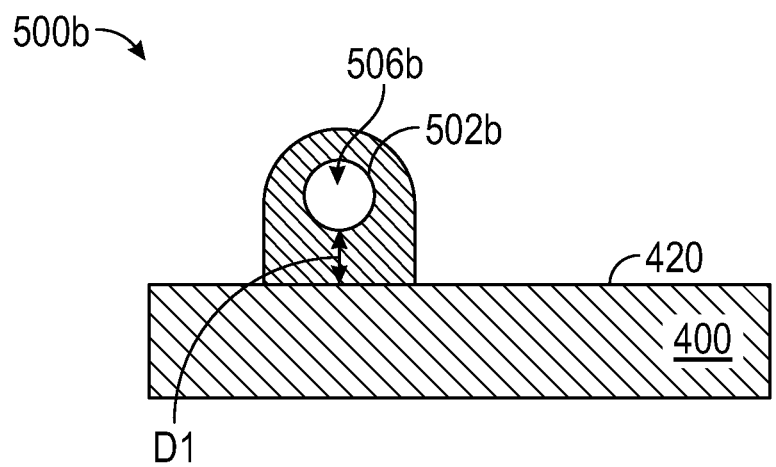

FIG. 4D is an illustration of a method of manufacturing the aperture extension feature of FIG. 4A, in accordance with an embodiment of the disclosure; and FIG. 4E is a side view of a configuration of a aperture extension feature for a combustor of a gas turbine engine, in accordance with an embodiment of the disclosure; and FIG. 4F is a side view of a configuration of a aperture extension feature for a combustor of a gas turbine engine, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of heat shield panels of the combustor may be used to help cool the combustor. Convective cooling may be achieved by air that is channeled between the heat shield panels and a combustion liner of the combustor. Impingement cooling may be a process of directing relatively cool air from a location exterior to the combustor toward a back or underside of the heat shield panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air to cool the heat shield panel. Cooling air is then transferred through effusion holes within the heat shield panel and into the combustion chamber. Cooling air passing through the effusion holes in the heat shield panels helps cool the heat shield panels by pulling heat away from heat shield panel through convective heat transfer. Particulates in the cooling air may also enter the combustion area of the combustion chamber through the effusion holes. Embodiments disclosed herein seek to address increasing the convective heat transfer of heat from the heat shield panel to the cooling air while seeking to minimize particulate entry into the combustion area through the effusion holes.

Figure 1:
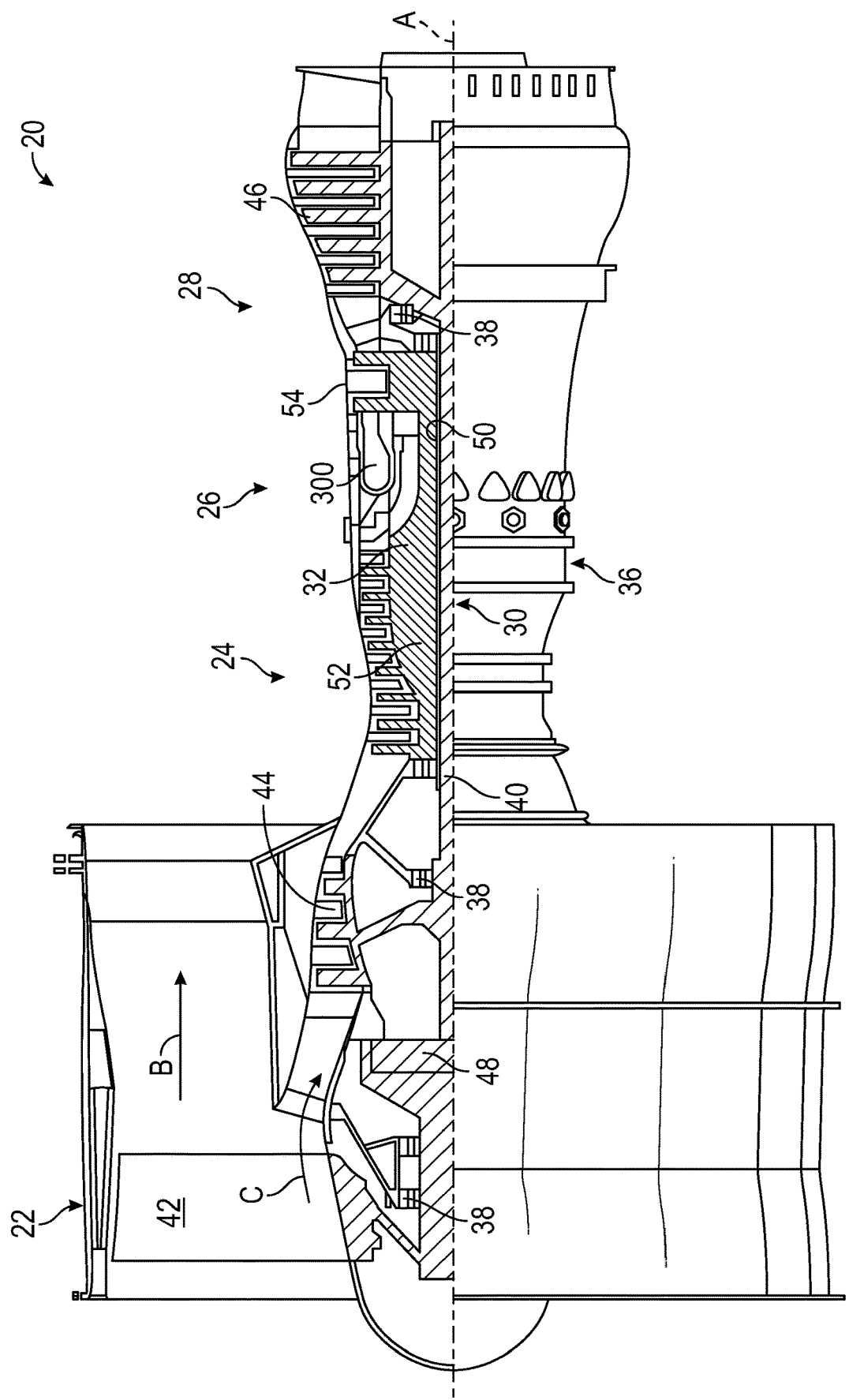
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
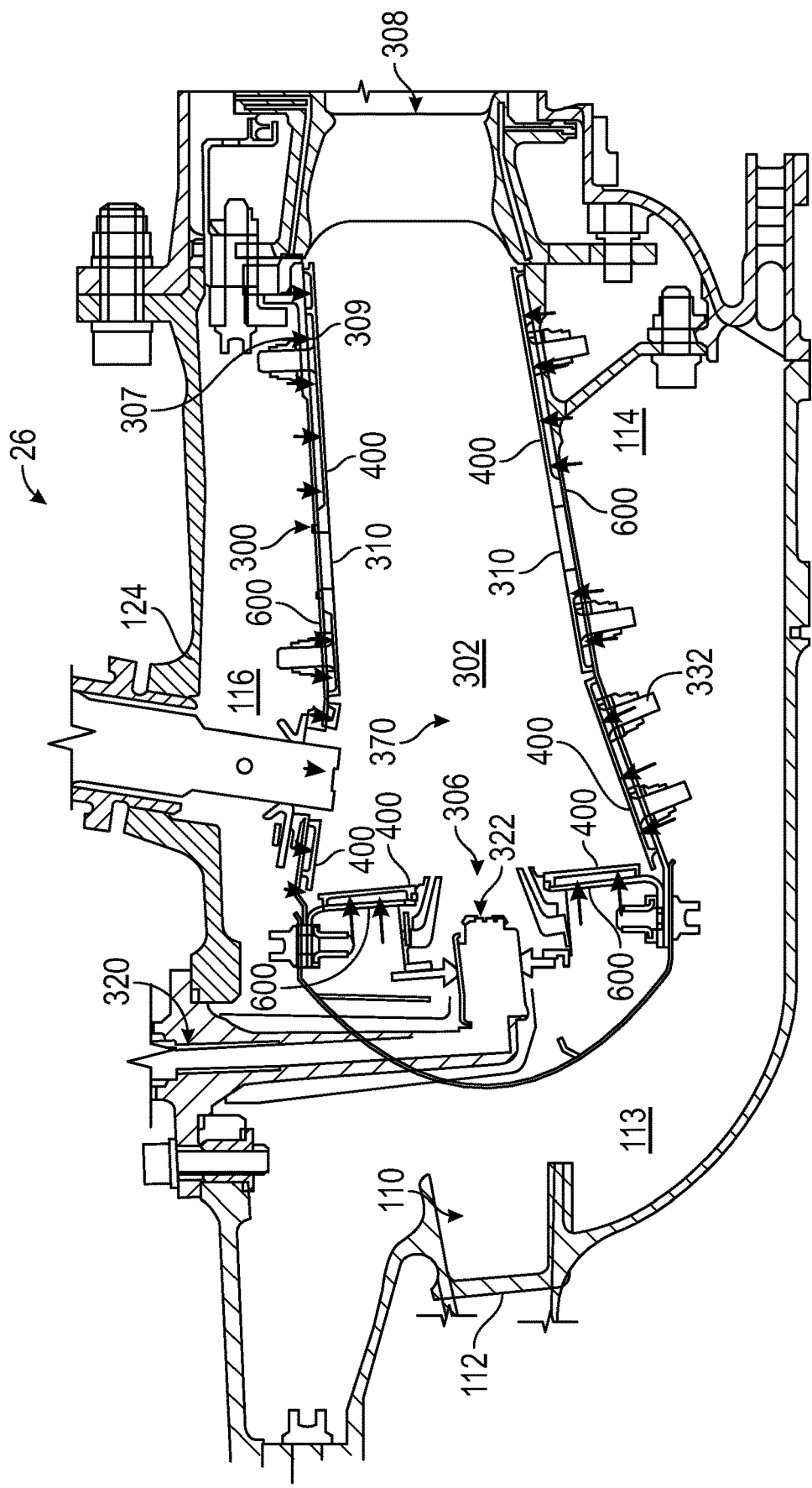
FIG. 2 is a cross-sectional illustration of a combustor, in accordance with an embodiment of the disclosure.

Referring now to FIG. 2 and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more impingement apertures 307 in the combustion liner 600 and one or more effusion apertures (i.e. effusion holes) 309 in the heat shield panels 400. The impingement apertures 307 and effusion apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

Figure 3:
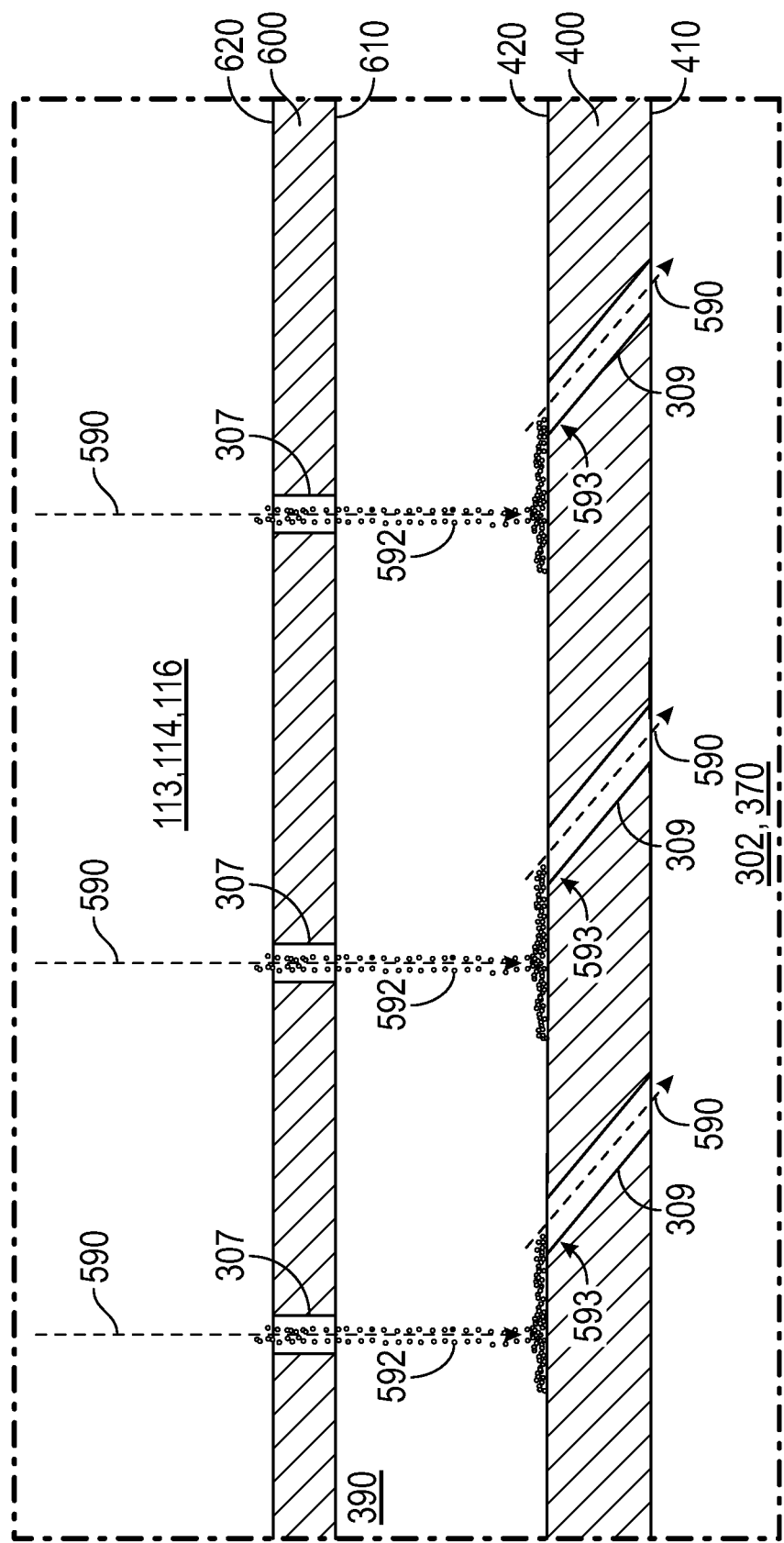
FIG. 3 is an enlarged cross-sectional illustration of a heat shield panel and combustion liner of a combustor, in accordance with an embodiment of the disclosure.

The combustor 300, as shown in FIG. 2, includes multiple heat shield panels 400 that are attached to the combustion liner 600 (See FIG. 3). The heat shield panels 400 may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partially enclose a combustion area 370 within the combustion chamber 302 of the combustor 300.

Referring now to FIGS. 3 and 4A-F with continued reference to FIGS. 1 and 2. FIG. 3 illustrates a heat shield panel 400 and combustion liner 600 of a combustor 300 (see FIG. 1) of a gas turbine engine 20 (see FIG. 1). The heat shield panel 400 and the combustion liner 600 are in a facing spaced relationship. The heat shield panel 400 includes a first surface 410 oriented towards the combustion area 370 of the combustion chamber 302 and a second surface 420 opposite the first surface 410 oriented towards the combustion liner 600. The combustion liner 600 has an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of impingement apertures 307 configured to allow airflow 590 from the inner diameter branch 114 and the outer diameter branch 116 to enter an impingement cavity 390 in between the combustion liner 600 and the heat shield panel 400. Each of the impingement apertures 307 extend from the outer surface 620 to the inner surface 610 through the combustion liner 600.

Each of the impingement apertures 307 fluidly connects the impingement cavity 390 to at least one of the inner diameter branch 114 and the outer diameter branch 116. The heat shield panel 400 may include one or more effusion apertures 309 configured to allow airflow 590 from the impingement cavity 390 to the combustion area 370 of the combustion chamber 302.

Each of the effusion apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420. As seen in FIG. 3, particulate 592 may accompany the airflow 590 flowing into the impingement cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3. Particulate 592 collecting upon the second surface 420 of the heat shield panel 400 reduces the cooling efficiency of airflow 590 impinging upon the second surface 420 and thus may increase local temperatures of the heat shield panel 400 and the combustion liner 600. Particulate 592 collection upon the second surface 420 of the heat shield panel 400 may potentially create a blockage 593 to the effusion apertures 309 in the heat shield panels 400, thus reducing airflow 590 into the combustion area 370 of the combustion chamber 302. The blockage 593 may be a partial blockage or a full blockage.

The heat shield panel 400 includes an aperture extension feature 500a-b configured to extend the length of the effusion aperture 309. The aperture extension feature 500a-b may extend outward from the second surface 420 of the heat shield panel 400 and into the impingement cavity 390. Advantageously, the addition of a aperture extension feature 500a-b to the heat shield panel 400 increases the surface area of the heat shield panel 400 by extending the effusion aperture 309, thus with more surface area the convention cooling ability of the effusion aperture 309 increases. The heat shield panel 400 may include one or more aperture extension features 500a-b.

The aperture extension feature 500a-b is configured to allow airflow 590 from the impingement cavity 390 to enter through an inlet 502a-b proximate the second surface 420, convey the airflow 590 through a passageway 506a-b, to an outlet 504a-b, leading into the effusion aperture 309, and expel the airflow 590 from the effusion aperture 309 into the combustion area 370. The passageway 506a-b fluidly connects the impingement cavity 390 to the combustion area 370 through the effusion aperture 309. The passageway 506a-b is fluidly connected to impingement cavity 390 through the inlet 502a-b. The passageway 506a-b is fluidly connected to effusion aperture 390 through the outlet 504a-b. The aperture extension feature 500a-b may be configured differently as shown in FIG. 4A. The aperture extension feature 500a-b may be integrally formed from the heat shield panel 400 or securely attached to the heat shield panel 400. FIG. 4B illustrates the aperture extension feature 500a-b being formed from a first section 400a of a heat shield panel 400 and then secured to a second section 400b of a heat shield panel 400 through a mechanical joint 402, such as, for example, a weld. FIG. 4C illustrates the aperture extension feature 500a-b being formed and then secured to the second surface 420 of the heat shield panel 400 through a mechanical joint 404, such as, for example, a weld or braze. FIG. 4D illustrates the aperture extension feature 500a-b being composed of two separate pieces 501, 503, which are formed and then secured to the second surface 420 of the heat shield panel 400 through a mechanical joint 404, such as, for example, a weld or braze.

FIG. 4A illustrates a first configuration of an aperture extension feature 500a. A thickness T1 of the heat shield panel 400 is greater at the first aperture extension feature 500a than a thickness T2 elsewhere in the heat shield panel 400, which allows the aperture extension feature 500a to extend away from the second surface 420 of the heat shield panel 400 into the impingement cavity 390.

The passageway 506a of the aperture extension feature 500a may include a guide wall 508a oriented at a selected angle $\alpha 1$, which may be equivalent to the angle $\beta 1$ of the effusion aperture 309. In the example illustrated in FIG. 4A, the guide wall 508a encloses the passageway 506a. As illustrated in FIGS. 4A and 4E, the passageway 506a may be circular in shape but it is understood that the passageway 506a may be shaped differently. The orientation of the inlet 502a may be about perpendicular to the second surface 420 of the heat shield panel 400, as shown in FIG. 4A. Also, as illustrated in FIGS. 4A and 4E, the inlet 502a may be circular in shape but it is understood that the inlet 502a may be shaped differently. The inlet 502a may be located at the second surface 420 of the heat shield panel 400, as seen in FIGS. 4A and 4E.

The inlet 502a may be located on a first face 510a of the aperture extension feature 500a. The first face 510a of the aperture extension feature 500a is oriented at a selected angle $\theta 1$ relative to the second surface 420 of the heat shield panel 400. In an embodiment, the selected angle $\theta 1$ greater than 0° but less than 120° (i.e. 0°<$\theta 1$<120°). In an embodiment, the first face 510a may be oriented about perpendicular to the second surface 420 of the heat shield panel 400 (i.e. $\theta 1 \approx 90°$). Advantageously, by orienting the first face 510a at a selected angle about perpendicular or acute relative to the second surface 420 of the heat shield panel 400, it prevents the first face 510a from becoming a ramped surface that may facilitate particulate 590 to flow up the first face 510a and into the inlet 502a. In alternate, embodiment, the selected angle $\theta 1$ is an obtuse angle (i.e. 90°>$\theta 1$>180°). Advantageously, by orienting the first face 510a at a selected angle about obtuse relative to the second surface 420 of the heat shield panel 400, it allows the inlet 502a to be about normal to the an axis B of the passageway 309.

A second face 512a is located opposite the first face 510a of the aperture extension feature 500a. The second face 512a may be oriented at a selected angle $\theta 2$ relative to the second surface 420. In an embodiment, the second face 512a may be oriented at a selected angle $\theta 2$ about equal an angle $\theta 3$ of the passageway 506a (i.e. $\theta 2 = \theta 3$). In another embodiment, the second face 512a may be oriented at a selected angle $\theta 2$ equal to or greater than the angle $\theta 3$ of the passageway 506a (i.e. $\theta 2 \geq \theta 3$). In another embodiment, the second face 512a may be oriented at a selected angle $\theta 2$ about equal to the selected angle α1 of the guide wall 508a of the passageway 506a (i.e. θ2=α1). In another embodiment, the second face 512a may be oriented at a selected angle θ2 equal to or greater than the selected angle α1 of the guide wall 508a of the passageway 506a (i.e. θ2≥α1).

FIG. 4A also illustrates a second configuration of an aperture extension feature 500b. A thickness T3 of the heat shield panel 400 is greater at the second aperture extension feature 500b than a thickness T2 elsewhere in the heatshield panel 400, which allows the aperture extension feature 500b to extend away from the second surface 420 of the heat shield panel 400 into the impingement cavity 390.

The passageway 506b of the aperture extension feature 500b may include a guide wall 508b oriented at a selected angle α1, which may be equivalent to the angle β1 of the effusion aperture 309. In the example illustrated in FIGS. 4A and 4F, the guide wall 508b encloses the passageway 506b. As illustrated in FIGS. 4A and 4F, the passageway 506b may be circular in shape but it is understood that the passageway 506b may be shaped differently. The orientation of the inlet 502b may be about perpendicular to the second surface 420 of the heat shield panel 400, as shown in FIG. 4A. Also, as illustrated in FIG. 4A, the inlet 502b may be circular in shape but it is understood that the inlet 502b may be shaped differently. The inlet 502b may be located at a selected distance D1 away from the second surface 420 of the heat shield panel 400, as seen in FIG. 4F. For example, the inlet 502b may be located outside of a boundary layer associated with the second surface 420 of the heat shield panel 400 within the impingement cavity 390. Advantageously, particulate 592 ingestion into the inlet 502b and subsequently the combustion area 370 is reduced by locating the inlet 502b a selected distance away from the second surface 420 of the heat shield panel 400 since particulate 590 tends to collect at the second surface 420.

The inlet 502b may be located on a first face 510b of the aperture extension feature 500b. The first face 510b of the aperture extension feature 500b is oriented at a selected angle θ1 relative to the second surface 420 of the heat shield panel 400. In an embodiment, the selected angle θ1 is greater than 0° but less than 120° (i.e. 0°<θ1<120°). In an embodiment, the first face 510b may be oriented about perpendicular to the second surface 420 of the heat shield panel 400 (i.e. θ1≈90°). Advantageously, by orienting the first face 510b at a selected angle about perpendicular or acute relative to the second surface 420 of the heat shield panel 400, it prevents the first face 510b from becoming a ramped surface that may facilitate particulate 590 to flow up the first face 510b and into the inlet 502b. In alternate, embodiment, the selected angle θ1 is an obtuse angle (i.e. 90°>θ1>180°). Advantageously, by orienting the first face 510a at a selected angle about obtuse relative to the second surface 420 of the heat shield panel 400, it allows the inlet 502a to be about normal to the an axis B of the passageway 309.

A second face 512b is located opposite the first face 510b of the aperture extension feature 500b. The second face 512b may be oriented at a selected angle θ2 relative to the second surface 420. In an embodiment, the second face 512b may be oriented at a selected angle θ2 about equal an angle θ3 of the passageway 506b (i.e. θ2=θ3). In another embodiment, the second face 512b may be oriented at a selected angle θ2 equal to or greater than the angle θ3 of the passageway 506b (i.e. θ2≥θ3). In another embodiment, the second face 512b may be oriented at a selected angle θ2 about equal to the selected angle α1 of the guide wall 508b of the passageway 506b (i.e. θ2=α1). In another embodiment, the second face 512b may be oriented at a selected angle θ2 equal to or greater than the selected angle α1 of the guide wall 508b of the passageway 506b (i.e. θ2≥α1).

It is understood that a combustor of a gas turbine engine is used for illustrative purposes and the embodiments disclosed herein may be applicable to additional components of other than a combustor of a gas turbine engine, such as, for example, a first component and a second component defining a cooling channel therebetween. The first component may have cooling holes similar to the impingement apertures and the second component may have cooling holes similar to the effusion holes. The cooling holes may direct air through the cooling channel to impinge upon the second component. The effusions holes direct air through the second component and in an area proximate the second component.

Technical effects of embodiments of the present disclosure include incorporating an aperture extension feature into a heat shield panel of the combustor to increase surface area of the heat shield panel at effusion hole to increase the convention cooling ability of air flowing through the effusion holes, while helping to reduce entry of the particulate into the combustion area.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A gas turbine engine component assembly, comprising:
a first component having a first surface and a second surface opposite the first surface, wherein the first component includes a cooling hole extending from the second surface to the first surface through the first component;
a second component having a first surface and a second surface, the first surface of the first component and the second surface of the second component defining a cooling channel therebetween in fluid communication with the cooling hole for cooling the second surface of the second component; and an aperture extension feature in the second component and extending outward from the second surface of the second component into the cooling channel, the aperture extension feature includes a passageway fluidly connecting the cooling channel to an area located proximate to the first surface of the second component, wherein the aperture extension feature includes a first face and an inlet located in the first face to fluidly connect the passageway to the cooling channel, the first face being oriented at an acute angle relative to the second surface of the second component as measured outside of the aperture extension feature.

2. The gas turbine engine component assembly of claim 1, wherein the first face extends outward from the second surface of the second component into the cooling channel.

3. The gas turbine engine component assembly of claim 1, wherein the inlet is located at the second surface.

4. The gas turbine engine component assembly of claim 1, wherein the inlet is located a selected distance away from the second surface.

5. The gas turbine engine component assembly of claim 4, wherein the selected distance is outside of a boundary layer associated with the second surface of the second component within the cooling channel.

6. The gas turbine engine component assembly of claim 1, wherein the second component further comprises a cooling hole extending from the second surface of the second component to the first surface of the second component and fluidly connecting the passageway to the area located proximate the first surface of the second component, and wherein the passageway includes an outlet that fluidly connects the passageway to the cooling hole of the second component.

7. The gas turbine engine component assembly of claim 1, wherein the aperture extension feature is integrally formed in the second component.

8. The gas turbine engine component assembly of claim 1, wherein the aperture extension feature is attached to the second surface of the second component through a mechanical joint.

9. A combustor for use in a gas turbine engine, the combustor enclosing a combustion chamber having a combustion area, wherein the combustor comprises:

a combustion liner having an inner surface and an outer surface opposite the inner surface, wherein the combustion liner includes an impingement aperture extending from the outer surface to the inner surface through the combustion liner;

a heat shield panel having a first surface and a second surface, the inner surface of the combustion liner and the second surface of the heat shield panel defining an impingement cavity therebetween in fluid communication with the impingement aperture for cooling the second surface of the heat shield panel; and an aperture extension feature in the heat shield panel and extending outward from the second surface of the heat shield panel into the impingement cavity, the aperture extension feature includes a passageway fluidly connecting the impingement cavity to the combustion area, wherein the aperture extension feature includes a first face and an inlet located in the first face to fluidly connect the passageway to the impingement cavity, the first face being oriented at an acute angle relative to the second surface of the heat shield panel as measured outside of the aperture extension feature.

10. The combustor of claim 9, wherein the first face extends outward from the second surface of the heat shield panel into the impingement cavity.

11. The combustor of claim 9, wherein the inlet is located at the second surface.

12. The combustor of claim 9, wherein the inlet is located a selected distance away from the second surface.

13. The combustor of claim 12, wherein the selected distance is outside of a boundary layer associated with the second surface of the heat shield panel within the impingement cavity.

14. The combustor of claim 9, wherein the heat shield panel further comprises a effusion aperture extending from the second surface of the heat shield panel to the first surface of the heat shield panel and fluidly connecting the passageway to the combustion area, and wherein the passageway includes an outlet that fluidly connects the passageway to the effusion aperture of the heat shield panel.

15. The combustor of claim 9, wherein the aperture extension feature is integrally formed in the heat shield panel.

16. The combustor of claim 9, wherein the aperture extension feature is attached to the second surface of the heat shield panel through a mechanical joint.

* * * * *